US010095585B1

(12) United States Patent
Proulx (10) Patent No.: US 10,095,585 B1
(45) Date of Patent: Oct. 9, 2018

(54) REBUILDING DATA ON FLASH MEMORY IN RESPONSE TO A STORAGE DEVICE FAILURE REGARDLESS OF THE TYPE OF STORAGE DEVICE THAT FAILS

(71) Applicant: EMC Corporation, Hopkinton, MA (US)

(72) Inventor: Ronald D. Proulx, Boxborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 72 days.

(21) Appl. No.: 15/194,671

(22) Filed: Jun. 28, 2016

(51) Int. Cl.
*G06F 11/34* (2006.01)
*G06F 11/14* (2006.01)
*G06F 3/06* (2006.01)

(52) U.S. Cl.
CPC .......... *G06F 11/1428* (2013.01); *G06F 3/065* (2013.01); *G06F 3/0619* (2013.01); *G06F 3/0659* (2013.01); *G06F 3/0685* (2013.01); *G06F 2201/805* (2013.01)

(58) Field of Classification Search
CPC ............................ G06F 11/14; G06F 11/1428
USPC ........................................................ 714/6.12
See application file for complete search history.

(56) References Cited

U.S. PATENT DOCUMENTS

| | | | |
|---|---|---|---|
| 8,006,061 B1 * | 8/2011 | Chatterjee | G06F 3/0605 711/170 |
| 8,566,553 B1 * | 10/2013 | Marshak | G06F 3/0619 711/170 |
| 8,694,724 B1 | 4/2014 | Linnell et al. | |
| 8,880,801 B1 | 11/2014 | Robins et al. | |
| 9,037,795 B1 | 5/2015 | Linnell et al. | |
| 9,128,910 B1 * | 9/2015 | Dayal | G06F 11/22 |
| 9,256,381 B1 | 2/2016 | Fultz et al. | |
| 9,311,207 B1 | 4/2016 | Marshak et al. | |
| 9,459,809 B1 * | 10/2016 | Chen | G06F 3/0644 |
| 9,507,887 B1 | 11/2016 | Wang et al. | |
| 2008/0168228 A1 * | 7/2008 | Carr | G06F 3/0605 711/117 |
| 2008/0288714 A1 * | 11/2008 | Salomon | G06F 3/0608 711/103 |
| 2010/0077252 A1 * | 3/2010 | Siewert | G06F 11/008 714/6.12 |
| 2010/0199036 A1 * | 8/2010 | Siewert | G06F 3/0613 711/112 |
| 2011/0010514 A1 * | 1/2011 | Benhase | G06F 3/061 711/162 |
| 2012/0042211 A1 * | 2/2012 | Brown | G06F 11/073 714/42 |

(Continued)

*Primary Examiner* — Kamini B Patel
(74) *Attorney, Agent, or Firm* — BainwoodHuang (57) ABSTRACT

A technique rebuilds data from a group of hard disk drives (HDDs). The technique is performed in data storage equipment and involves storing data on a group of HDDs. The group of HDDs is constructed and arranged to maintain data availability following a HDD failure. The technique further involves, after storing the data on the group of HDDs, detecting a failure of a particular HDD of the group of HDDs. The technique further involves, after detecting the failure of the particular HDD, rebuilding a particular portion of data onto a solid state drive (SSD) based on other portions of the data residing on remaining HDDs of the group of HDDs other than the particular HDD, the particular portion of the data having resided on the particular HDD that failed.

21 Claims, 7 Drawing Sheets

(56) References Cited

U.S. PATENT DOCUMENTS

| | | | |
|---|---|---|---|
| 2012/0059978 A1* | 3/2012 | Rosenband | G06F 3/0613 711/103 |
| 2012/0110252 A1* | 5/2012 | McKean | G06F 11/1662 711/103 |
| 2013/0205088 A1* | 8/2013 | Benhase | G06F 12/0811 711/122 |
| 2014/0173199 A1* | 6/2014 | Gupta | G06F 17/30221 711/117 |
| 2014/0325262 A1* | 10/2014 | Cooper | G06F 11/108 714/6.22 |

* cited by examiner

REBUILDING DATA ON FLASH MEMORY IN RESPONSE TO A STORAGE DEVICE FAILURE REGARDLESS OF THE TYPE OF STORAGE DEVICE THAT FAILS

BACKGROUND

A conventional data storage array includes storage processors and storage devices. During operation, the storage processors respond to input/output (I/O) requests (e.g., Small Computer System Interface or SCSI commands) from one or more host computers by storing host data into the storage devices and/or loading host data from the storage devices.

Some conventional data storage arrays may include different storage tiers such a high-speed storage tier of flash drives, a moderate-speed storage tier of Serial Attached SCSI or SAS drives, and a low-speed storage tier of near-line SAS drives. For such an array, the flash drives of the high-speed storage tier typically form a first Redundant Array of Independent Disks or RAID group for frequently accessed host data, the SAS drives of the moderate-speed storage tier typically form a second RAID group for less frequently accessed host data, and the near-line SAS drives of the low-speed storage tier typically form a third RAID group for infrequently accessed host data.

SUMMARY

Unfortunately, there are deficiencies to the above described conventional data storage arrays that have storage devices of different types forming different storage tiers. Along these lines, in response to a failure of a near-line SAS drive of the low-speed storage tier of near-line SAS drives, host data that resided on the failed near-line SAS drive is typically rebuilt on another near-line SAS drive (i.e., a spare drive of the same type). Likewise, in response to a failure of a SAS drive of the moderate-speed storage tier of SAS drives, host data that resided on the failed SAS drive is typically rebuilt on another SAS drive.

However, rebuilding data on a magnetic disk drive such as a near-line SAS drive or a SAS drive takes a significant amount of time. For example, rebuilding host data on a 1 TB magnetic disk drive may take well over 24 hours. During such time, a failure of a second magnetic disk drive of the same tier may result in lost data, e.g., two failed disk drives may result in lost data in a RAID group that implements RAID 5.

In contrast to the above-described conventional data storage arrays that rebuild data that resided on a failed SAS drive on another SAS drive and that rebuild data that resided on a failed near-line SAS drive on another near-line SAS drive, etc., improved techniques are directed to rebuilding data on flash memory regardless of the type of storage device that fails. Such techniques minimize the amount of time that the data on the remaining storage devices is vulnerable to data loss due to a second storage device failure (e.g., at least one half of the time to rebuild the data on a magnetic storage drive). Along these lines, if a magnetic disk drive of a RAID group fails, data can be rebuilt on an available flash drive and copied to a spare magnetic disk drive. Even though it may take some time for the rebuilt data to be fully moved to the spare magnetic disk drive, the data is no longer vulnerable to data loss due to a second failed magnetic disk drive once the data has been rebuilt on the flash drive.

One embodiment is directed to a method of rebuilding data from a group of hard disk drives (HDDs). The method is performed in data storage equipment and includes storing data on a group of HDDs. The group of HDDs is constructed and arranged to maintain data availability following a HDD failure. The method further includes, after storing the data on the group of HDDs, detecting a failure of a particular HDD of the group of HDDs. The method further includes, after detecting the failure of the particular HDD, rebuilding a particular portion of data onto a solid state drive (SSD) based on other portions of the data residing on remaining HDDs of the group of HDDs other than the particular HDD, the particular portion of the data having resided on the particular HDD that failed.

In some arrangements, the data storage equipment forms at least part of a data storage system which includes a spare HDD and a spare SSD. In these arrangements, rebuilding the particular portion of data onto the SSD includes writing the particular portion of data to the spare SSD prior to writing any of the particular portion of data onto the spare HDD.

In some arrangements, the data storage equipment is constructed and arranged to manage host data on behalf of a set of host computers. In these arrangements, the data storage system has (i) a first storage tier of SSDs, the first storage tier including the spare SSD and (ii) a second storage tier of HDDs, the second storage tier including the group of HDDs and the spare HDD. Here, the method may further include promoting frequently accessed host data from the second storage tier of HDDs to the first storage tier of SSDs, and demoting infrequently accessed host data from the first storage tier of SSDs to the second storage tier of HDDs, the frequently access host data being more frequently accessed than the infrequently accessed host data.

In some arrangements, the method further includes copying the particular portion of data from the spare SSD to the spare HDD. In these arrangements, the method further includes, after the particular portion of data is copied from the spare SSD to the spare HDD, returning the spare SSD to an unused and available state.

In some arrangements, copying the particular portion of data from the spare SSD to the spare HDD includes:
  (i) prior to writing any data to the spare HDD, detecting a rebuild completion event in which the particular portion of data becomes fully restored on the spare SSD, and
  (ii) in response to the rebuild completion event, writing the particular portion of data from the spare SSD to the spare HDD.

In some arrangements, copying the particular portion of data from the spare SSD to the spare HDD includes writing at least some of the particular portion of data from the spare SSD to the HDD while the particular portion of data is being rebuilt onto the spare SSD.

In some arrangements, the data storage equipment includes storage processing circuitry which is constructed and arranged to process input/output (I/O) requests from the host computers. In these arrangements, the method further includes processing a set of I/O requests from the host computers while the particular portion of data is being rebuilt onto the spare SSD.

In some arrangements, the data storage equipment includes storage processing circuitry which is constructed and arranged to process input/output (I/O) requests from the host computers. In these arrangements, the method further includes providing data elements from the spare SSD to the set of host computers in response to a set of I/O requests from the host computers.

In some arrangements, providing data elements from the spare SSD to the set of host computers includes, in response to an I/O request from a host computer, reading a data element from the spare SSD and sending the data element to the host computer while the particular portion of data is being rebuilt onto the spare SSD.

In some arrangements, providing data elements from the spare SSD to the set of host computers includes, in response to an I/O request from a host computer, reading a data element from the spare SSD and sending the data element to the host computer while the particular portion of data is being copied from the spare SSD to the spare HDD.

In some arrangements, data storage system includes multiple available SSDs. In these arrangements, rebuilding the particular portion of data onto the SSD further includes:
  (i) prior to writing the particular portion of data to the spare SSD, selecting a candidate SSD from the multiple available SSDs,
  (ii) confirming that the candidate SSD has a storage capacity that is greater than or equal to a storage capacity of the particular HDD that failed, and
  (iii) initiating a rebuild process to rebuild the particular portion of data upon confirming that the storage capacity of the candidate SSD is greater than or equal to the storage capacity of the particular HDD that failed.

In some arrangements, the data storage system includes multiple available SSDs. Each available SSD has a storage capacity which is less than a storage capacity of the particular HDD that failed. In these arrangements, rebuilding the particular portion of data onto the SSD further includes:
  (i) prior to writing the particular portion of data to the spare SSD, configuring the multiple available SSDs into a logical combination of SSDs, the logical combination of SSDs providing a storage capacity that is greater than or equal to the storage capacity of the particular HDD that failed and operating as the spare SSD, and
  (ii) initiating a rebuild process to rebuild the particular portion of data upon configuring the multiple available SSDs into the logical combination of SSDs.

Another embodiment is directed to data storage equipment which includes memory and control circuitry coupled to the memory. The memory stores instructions which, when carried out by the control circuitry, cause the control circuitry to:
  (A) store data on a group of HDDs, the group of HDDs being constructed and arranged to maintain data availability following a HDD failure,
  (B) after storing the data on the group of HDDs, detect a failure of a particular HDD of the group of HDDs, and
  (C) after detecting the failure of the particular HDD, rebuild a particular portion of data onto a SSD based on other portions of the data residing on remaining HDDs of the group of HDDs other than the particular HDD, the particular portion of the data having resided on the particular HDD that failed.

Yet another embodiment is directed to a computer program product having a non-transitory computer readable medium which stores a set of instructions to rebuild data from a group of HDDs. The set of instructions, when carried out by computerized circuitry, causes the computerized circuitry to perform a method of:
  (A) storing data on a group of HDDs, the group of HDDs being constructed and arranged to maintain data availability following a HDD failure;
  (B) after storing the data on the group of HDDs, detecting a failure of a particular HDD of the group of HDDs; and
  (C) after detecting the failure of the particular HDD, rebuilding a particular portion of data onto a SSD based on other portions of the data residing on remaining HDDs of the group of HDDs, the particular portion of the data having resided on the particular HDD that failed.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in rebuilding data on flash memory in response to a storage device failure regardless of the type of storage device that fails.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to rebuilding data on flash memory in response to a storage device failure regardless of the type of storage device that fails. Such a technique minimizes the amount of time that the data on the remaining storage devices is vulnerable to data loss due to a second storage device failure (e.g., less than half of the time that it takes to rebuild the data on a magnetic storage drive). Along these lines, if a magnetic disk drive of a RAID group fails, data can be rebuilt on an available flash drive and copied to a spare magnetic disk drive of the same type that failed. Even though it may take some time for the rebuilt data to be fully copied from the flash drive to the spare magnetic disk drive, the data is no longer vulnerable to data loss due to a second failed magnetic disk drive as soon as the data has been rebuilt on the flash drive.

Figure 1:
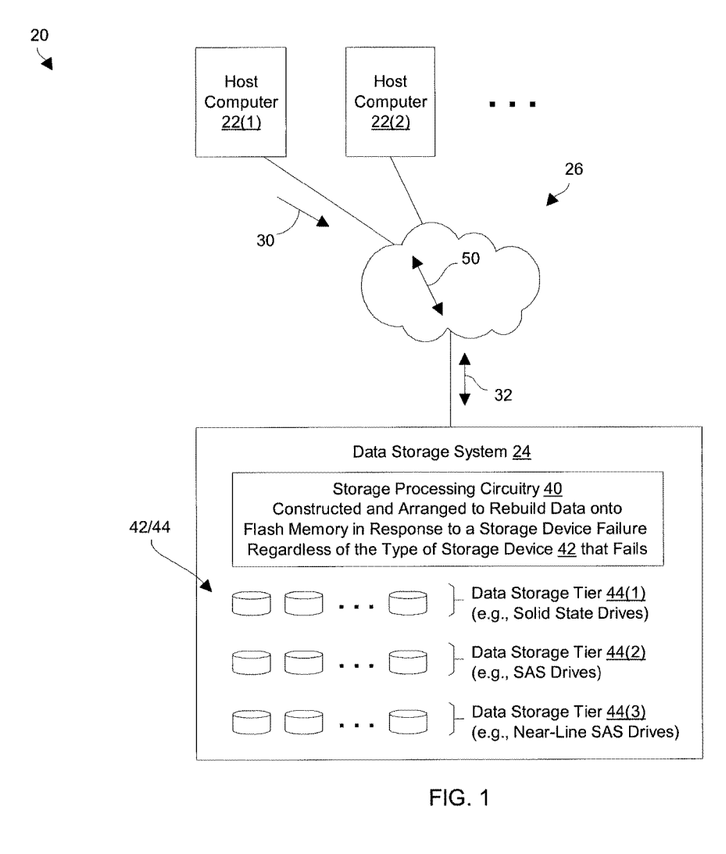
FIG. 1 is a block diagram of a data storage environment which has the ability to rebuild data in response to a storage device failure regardless of the type of storage device that fails.

FIG. 1 is a block diagram of a data storage environment 20 which has the ability to rebuild data in response to a storage device failure regardless of the type of storage device that fails. The data storage environment 20 includes host computers 22(1), 22(2), . . . (collectively, host computers 22), a data storage system 24, and a communications medium 26.

Each host computer 22 is constructed and arranged to provide input/output (I/O) requests 30 to the data storage system 24 (e.g., to access logical units of storage or LUNs, virtual volumes, files of file systems, combinations thereof, etc.). Accordingly, each host computer 22 is able to perform useful work, e.g., operate as a database server, a file server, an application server, a content server, an email server, a web site, and so on.

The data storage system 24 is constructed and arranged to robustly and reliably manage host data 32 on behalf of the host computers 22. In particular, the data storage system 24 includes storage processing circuitry 40 (e.g., a communications interface for communicating with the host computers 22, a set of storage processors, a storage device interface, etc.), and storage devices 42. The storage processing circuitry 40 responds to the I/O requests 30 from the host computers 22 to load host data 32 into and retrieve host data 32 from the storage devices 40. The storage devices 42 store the host data 32 in a non-volatile manner with fault tolerance (e.g., parity for error checking and data reconstruction).

The storage devices 42 include different types of storage (i.e., flash memory and magnetic disk drives) arranged in data storage tiers 44. By way of example, such storage is formed by a tier 44(1) of very fast storage devices (e.g., solid state drives), a tier 44(2) of moderately fast storage devices (e.g., SAS drives), and a tier 44(3) of slower storage devices (e.g., near-line SAS drives). It should be understood that three data storage tiers 44 are shown by way of example only and that other situations are suitable for use as well, e.g., two tiers, four tiers, etc.

The communications medium 26 is constructed and arranged to connect the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, combinations thereof, etc.

During operation, the storage processing circuitry 40 responds to the I/O requests 30 from the host computers 22 by performing load and store operations. In particular, the storage processing circuitry 40 stores the hottest host data 32 (i.e., the host data 32 that is most frequently accessed) in the fastest tier 44(1). Additionally, the storage processing circuitry 40 stores the less frequently accessed host data 32 in the moderate-speed tier 44(2) (e.g., as the cooler host data 32 in the fastest tier 44(1) is evicted to make room for hotter host data 32). Similarly, the storage processing circuitry 40 stores the least frequently accessed host data 32 in the slowest tier 44(3) (e.g., as the cooler host data 32 in the tier 44(2) is evicted to make room for hotter host data 32).

When the storage processing circuitry 40 stores host data 32 in a particular tier 44, the storage processing circuitry 40 implements a RAID level or scheme which enables the host data 32 to be rebuilt in the event of a storage device failure. For example, RAID 5 may be implemented where the host data 32 and parity are striped across five storage devices 42 of the same type (i.e., a "4+1 RAID group"). Examples of other suitable RAID levels include RAID 4, RAID 6, RAID 10, and so on.

It should be understood that each data storage tier 44 is provisioned with at least one hot spare storage device 42. In some arrangements, the data storage system 24 is provisioned with at least one spare storage device 42 for every 30 in-use storage devices 42 of the same type (i.e., a ratio of 1-to-30). For example, if the tier 44(1) includes 90 in-use solid state devices (SSDs), there are at least three spare SSDs. Likewise, if the tier 44(2) includes 90 in-use SAS drives, there are at least three spare SAS drives, and so on.

If there is a failure of a storage device 42, the storage processing circuitry 40 rebuilds the data on the failed storage device 42 on one of the spare SSDs. For example suppose that a hard disk drive (HDD) of the tier 44(2) fails. The storage processing circuitry 40 rebuilds the data that resided on the failed HDD on a spare SSD and copies the rebuilt data from that SSD to a spare HDD of the same type that failed. Accordingly, the rebuild time is minimized and the data in the tier 44(2) is not vulnerable to data loss due to a second storage device failure longer than necessary. Further details will now be provided with reference to FIG. 2.

Figure 2:
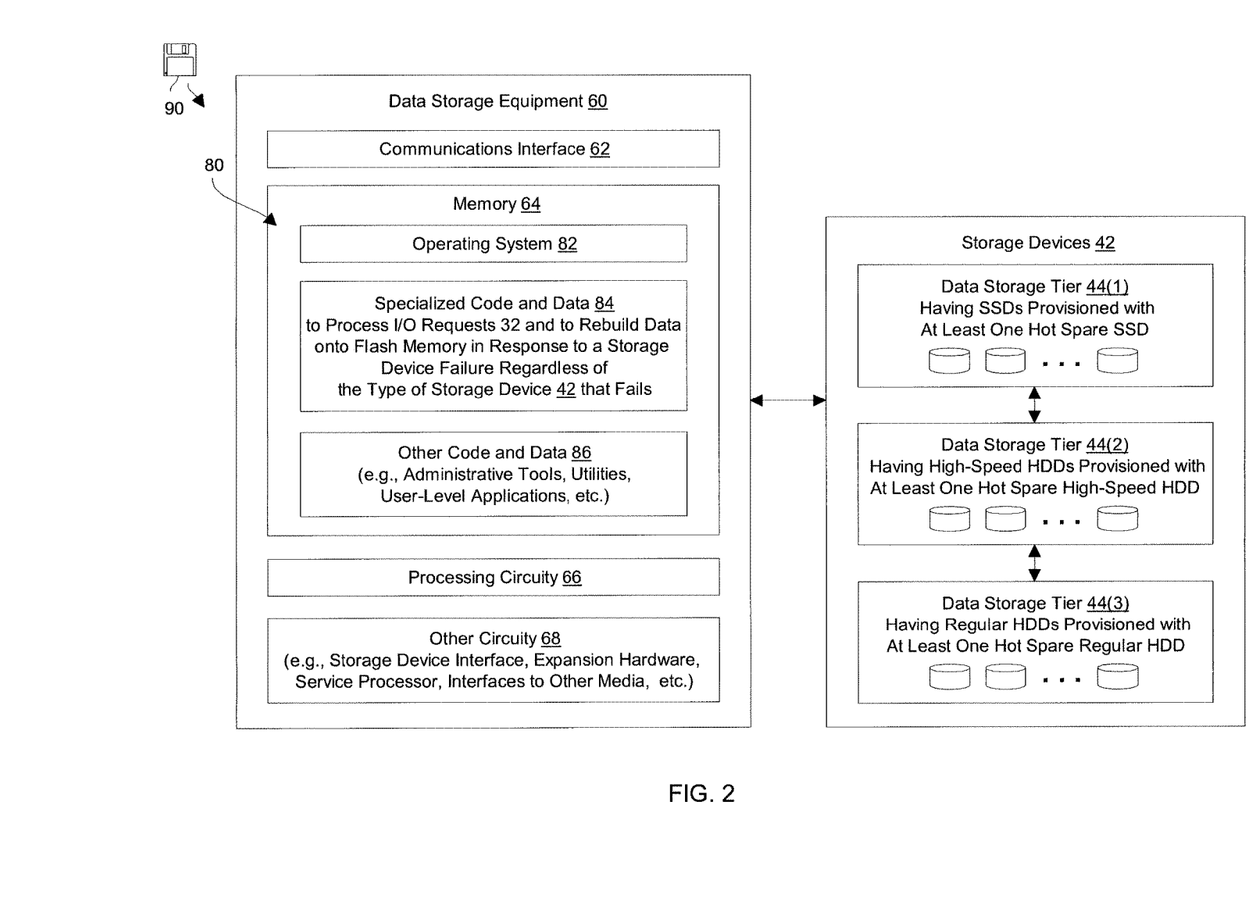
FIG. 2 is a block diagram of data storage equipment of the data storage environment of FIG. 1.

FIG. 2 is a block diagram of data storage equipment 60 which is suitable use as the storage processing circuitry 40 of the data storage system 24 of FIG. 1. The data storage equipment 60 includes a communications interface 62, memory 64, processing circuitry 66, and other circuitry 68.

The communications interface 62 is constructed and arranged to connect the data storage equipment 60 to the communications medium 26 (FIG. 1). Accordingly, the communications interface 62 enables the data storage equipment 60 to communicate with the other components of the data storage environment 20. Such communications may be cable-based or wireless (i.e., IP-based, SAN-based, cellular, Bluetooth, combinations thereof, and so on).

The memory 64 is intended to represent both volatile storage (e.g., DRAM, SRAM, etc.) and non-volatile storage (e.g., flash memory, magnetic disk drives, etc.). The memory 64 stores a variety of software constructs 80 including an operating system 82, specialized code and data 84, and other code/data 86.

The processing circuitry 66 is constructed and arranged to operate in accordance with the various software constructs 80 stored in the memory 64. In particular, the processing circuitry 66, when executing the operating system 82, manages various parts of the data storage equipment 60 (e.g., memory allocation, processor cycles, etc.). Additionally, the processing circuitry 66, when operating in accordance with the specialized applications and data 84, forms specialized circuitry which processes the I/O requests 30 from the host computers 22 and rebuilds data onto flash memory (e.g., a spare SSD) in response to a storage device failure regardless of the type of storage device 42 that fails. Furthermore, the other code and data 86 represent various types of information/resources such as administrative tools, utilities, user-level applications, and so on.

It should be understood that the above-mentioned specialized circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the data storage equipment 60. The computer program product 90 has a non-transitory and non-volatile computer readable medium which stores a set of instructions to control one or more operations of the data storage equipment 60. Examples of suitable computer readable storage media include tangible articles of manufacture and apparatus which store instructions in a non-volatile manner such as CD-ROM, DVD, flash memory, disk memory, tape memory, and the like.

The other circuitry 68 represents additional specialized hardware and/or componentry of the data storage equipment 60. For example, the data storage equipment 60 may include a specialized storage device interface to connect to the storage devices 42 that form the various data storage tiers 44. As another example, the data storage equipment 60 may further includes specialized equipment for archiving, backups, administrator access, and so on.

At this point, it should be appreciated that the data storage equipment 60 is more than a general purpose computer. Rather, the data storage equipment 60 is constructed and arranged for the primary purpose of performing data storage operations on behalf of the host computers 22 (FIG. 1). Along these lines, the data storage equipment 60 writes host data 32 into and reads host data 32 from the storage devices 42 in an optimized manner, e.g., with low latency, load balancing, fault tolerance, etc.

Additionally, specialized services augment and enhance the data storage operation. Such services may include deduplication, compression, snapshots, backups, archiving, replication, and so on.

It should be understood that the different data storage tiers 44 provide different access speeds. In particular, the storage devices 42 of the tier 44(1) are SSDs and thus provide the fastest access speeds. The storage devices 42 of the tier 44(2) are high-speed HDDs and thus provide moderate access speeds which are slower than the fastest access speeds. The storage devices 42 of the tier 44(3) are regular HDDs and thus provide regular access speeds which are slower than the moderate access speeds.

Furthermore, each data storage tier 44 is configured to sustain a storage device failure. For example, each data storage tier 44 may implement one or more RAID groups that enable data reconstruction from the remaining non-failed storage devices 42. Examples of suitable RAID levels include RAID 5 (4+1), RAID 5 (8+1), etc.

Moreover, each data storage tier 44 is provisioned with at least one hot spare storage device 42 for use in the event of a storage device failure. For example, the tier 44(1) may include at least 90 SSDs and, to satisfy a ratio of one host spare per every 30 storage devices 42, includes at least three hot spare SSDs. Likewise, the tier 44(2) may include at least 90 HDDs and, to satisfy a ratio of one host spare per every 30 storage devices 42, includes at least three hot spare HDDs, and so on.

As will be explained in further detail shortly, in the event of a storage device failure, the data storage equipment 30 is constructed and arranged to rebuild data onto a hot spare SSD of the tier 44(1) (if one is available) in response to the storage device failure regardless of the type of storage device 42 that fails. Such operation minimizes the amount of time that the data is susceptible to a possible second storage device failure that would cause data loss. Further details will now be provided with reference to FIGS. 3 through 6.

Figure 3:
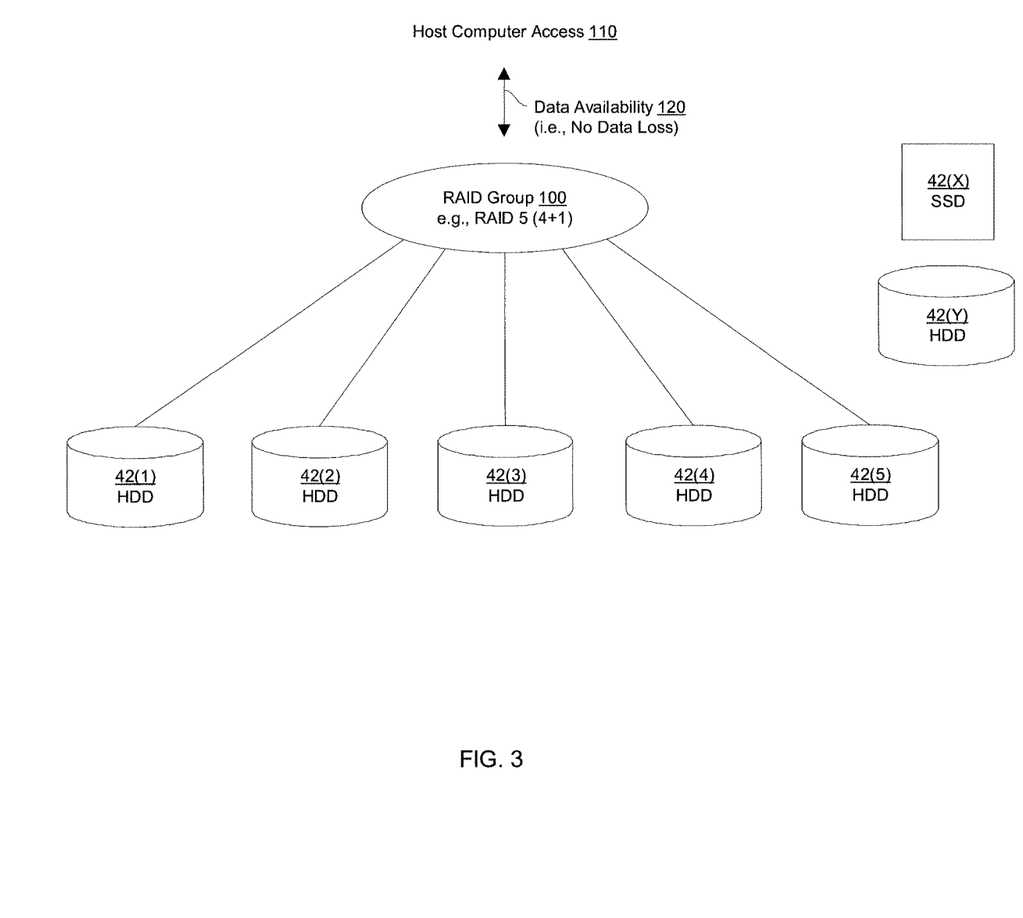
FIG. 3 is a block diagram an example data storage situation at a first time.
Figure 4:
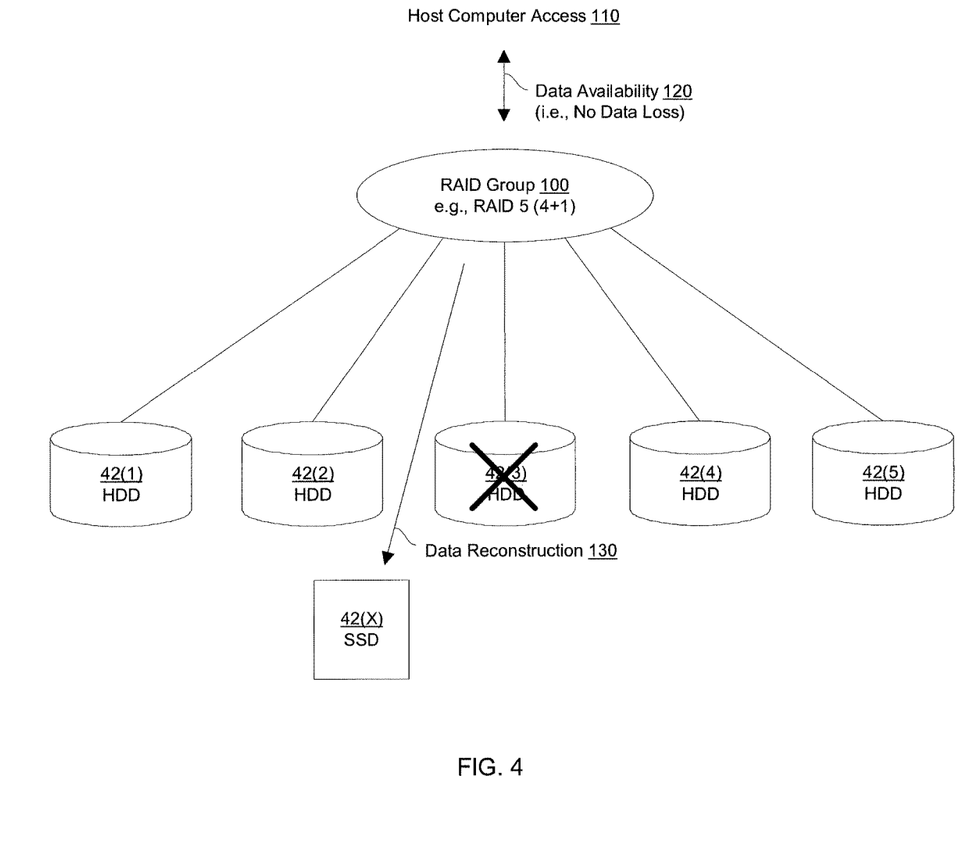
FIG. 4 is a block diagram an example data storage situation at a second time after the first time.
Figure 5:
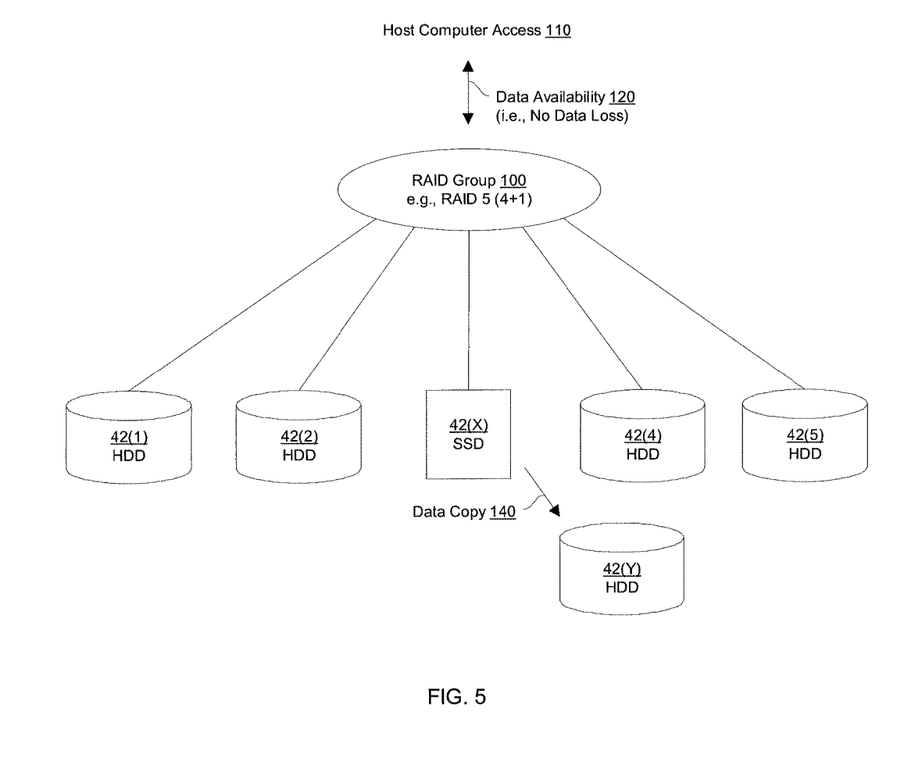
FIG. 5 is a block diagram an example data storage situation at a third time after the second time.
Figure 6:
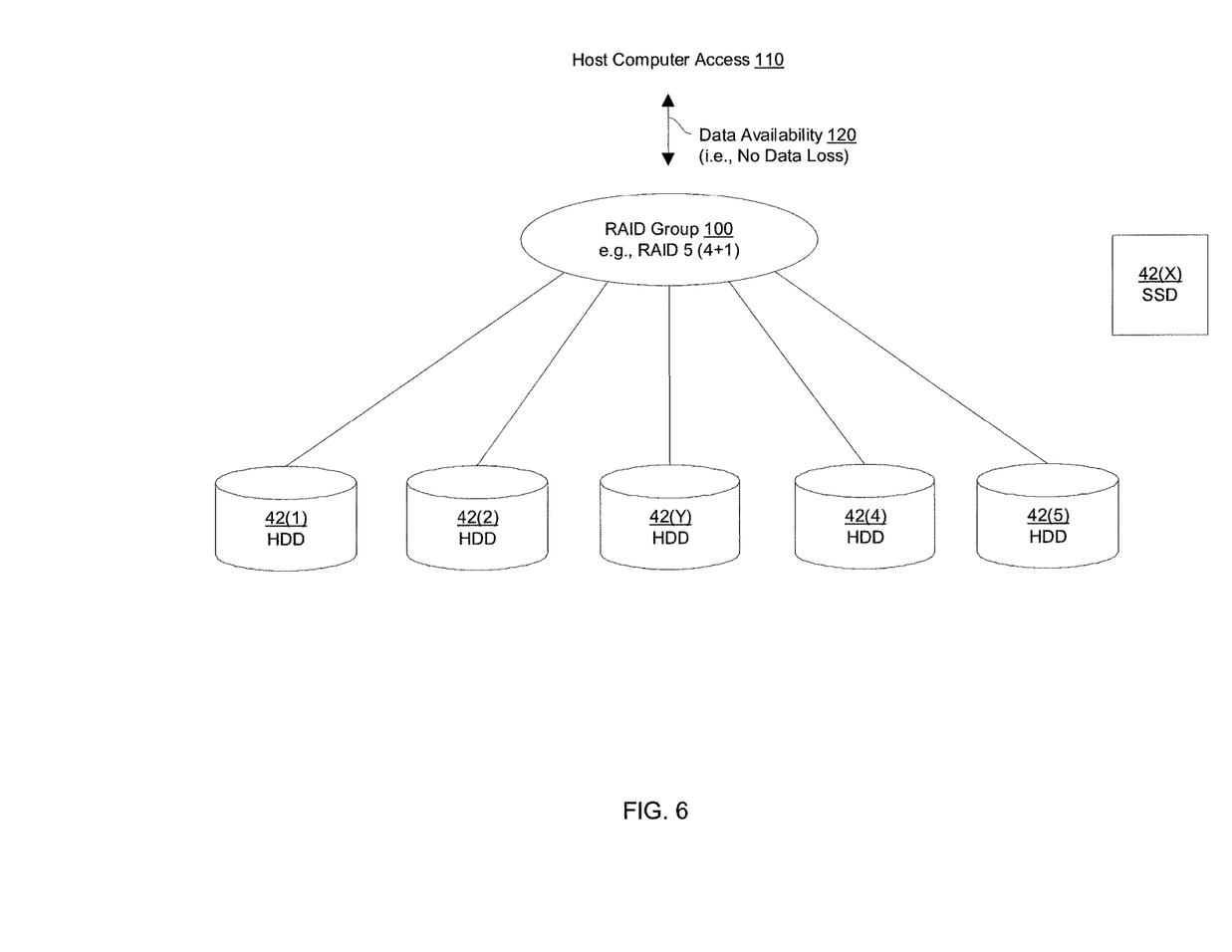
FIG. 6 is a block diagram an example data storage situation at a fourth time after the third time.

FIGS. 3 through 6 show a data restoration process that the storage processing circuitry 40 of the data storage system 24 performs in response to a failed storage device 42. The data restoration process involves rebuilding data that resided on the failed storage device 42 onto flash memory regardless of the type of storage device 42 that failed. FIG. 3 shows an initial situation in which data and parity are stored within five HDD storage devices 42. FIG. 4 shows a subsequent situation in which one of the HDD storage devices 42(3) fails and data reconstruction begins on a spare SSD storage device 42. FIG. 5 shows a subsequent situation in which data and parity are fully reconstructed on the spare SSD storage device 42(X) and in which copying occurs from the spare SSD storage device 42 to a spare HDD storage device 42(Y). FIG. 6 shows a subsequent situation in which the data and parity are again stored within five HDD storage devices 42 where a failed HDD storage device 42(3) is replaced with the other HDD storage device 42(Y).

In this example, suppose that the storage processing circuitry 40 manages data in five HDD storage devices 42(1), 42(2), 42(3), 42(4), and 42(5) in accordance with RAID 5 (4+1). In particular, each HDD storage device 42 stores distributed block-level stripes of data and parity (hereinafter simply referred to as data) that enables the data to be reconstructed even in the event of a failure of one HDD storage device 42.

As shown in FIG. 3, the RAID group 100 formed by the five HDD storage devices 42(1), 42(2), 42(3), 42(4), and 42(5) is initially intact and provides access 110 to one or more host computers 22, i.e., there is robust and reliable data availability 120 (also see FIG. 1). In this situation, there is an available hot spare SSD storage device 42(X) and an available hot spare HDD storage device 42(Y). Additionally, in this situation, the RAID group 100 is able to withstand a failure of an HDD storage device 42 without data loss.

Now, as shown in FIG. 4, suppose that the HDD storage device 42(3) fails (e.g., illustrated by the "X" in FIG. 4). It should be understood that, when the HDD storage device 42(3) initially goes offline, the storage processing circuitry 40 may wait a predefined amount of time (e.g., two minutes, five minutes, etc.) in the event that the HDD storage device 42(3) comes back online before starting the rebuild process. For example, a human administrator may have inadvertently removed the HDD storage device 42(3) from its location and then replaced it thus alleviating the need to start the rebuilding process.

After the predefined amount of time expires and the failed HDD storage device 42(3) is still offline, the storage processing circuitry 40 commits the hot spare SSD storage device 42(X) for use in the rebuild process. Along these lines, the storage processing circuitry 40 may select the hot spare SSD storage device 42(X) from multiple available hot spare SSD storage devices 42 if available. Additionally, the storage processing circuitry 40 confirms that the storage capacity of the selected hot spare SSD storage device 42(X) is greater than or equal to the storage capacity of the failed HDD storage device 42(3) thus ensuring that all of the data can be reconstructed on the hot spare SSD storage device 42(X).

During the rebuild process, the storage processing circuitry 40 performs XOR operations on portions of data remaining on the other non-failed HDD storage devices 42(1), 42(2), 42(4), and 42(5) to generate the data that resided on the failed HDD storage device 42(3). While the rebuild takes place, the RAID group 100 continues to provide access 110 to the data. That is, there is continued data availability 120 where the storage processing circuitry 40 responds to I/O requests 30 from the host computers 22. If particular data that is requested has already been reconstructed on the SSD storage device 42(X), that data can be read directly from the SSD storage device 42(X). However, if particular data that is requested has not yet been reconstructed on the SSD storage device 42(X), that data can be reconstructed on demand from the non-failed HDD storage devices 42(1), 42(2), 42(4), and 42(5) (e.g., via XOR operations).

It should be understood that while the data is being rebuilt on the SSD storage device 42(X), the RAID group 100 is susceptible to data loss if another HDD storage device 42 of the RAID group fails. However, the amount of time required to rebuild the data that resided on the failed HDD storage device 42(3) may be less than half the time that would be required to rebuild the data on the HDD storage device 42(Y) (i.e., the ultimate location for that data). Accordingly, the amount of time that the RAID group 100 is vulnerable to a second storage device failure is minimized.

One should appreciate that, since the hot spare SSD storage device 42(X) was not in use, it was the best resource available for minimizing this window of vulnerability. Moreover, there no concern regarding wearing out the flash memory since the SSD storage device 42(X) is a hot spare and thus rarely used.

It should be understood that it is possible to begin copying data from the SSD storage device 42(X) to the HDD storage device 42(Y) while data is being rebuilt on the SSD storage device 42(X). However, if such operation is to take place, such operation should not compete in a manner that would otherwise slow the rebuild process.

Upon completion of the rebuild process and as shown in FIG. 5, the RAID group 100 is still in operation. In particular, there is still host computer access 110 where the data of the RAID group 100 is fully available. Moreover, the RAID group 100 is no longer susceptible to data loss if another storage device 42 of the RAID group 100 were to fail. Rather, the data on the second failed storage device 42 can be rebuilt in the same manner as explained above, i.e., on another SSD storage device 42, or on a hot spare HDD storage device 42 if there is not another SSD storage device 42 available.

As further shown in FIG. 5, if copying of the data from the SSD storage device 42 to the hot spare HDD storage device 42(Y) did not begin during the rebuild process, copying commences upon completion of the rebuild process. In particular, the storage processing circuitry 40 writes the data from the SSD storage device 42(X) to the hot spare HDD storage device 42(Y). At this same time, the storage processing circuitry 40 continues to process I/O requests 30 from the host computers 22.

In some arrangements, if there are no spare storage devices 42 available and the data storage system 20 sustains a second storage device failure, the storage processing circuitry 40 may terminate the copying process and reuse the HDD storage device 42(Y) for rebuilding data of the failed storage device 42. Once the data of the second failed storage device 42 is rebuilt on the HDD storage device 42(Y), the data storage system 20 is able to again withstand another storage device failure.

FIG. 6 shows a situation in which all of the rebuilt data has been copied from the SSD storage device 42(X) to the hot spare HDD storage device 42(Y). Here, the RAID group 100 now includes HDD storage devices 42(1), 42(2), 42(Y), 42(4), and 42(5), and the SSD storage device 42(X) is again made available for use as a hot spare. That is, the HDD storage device 42(Y) now holds the data (and parity) that originally resided on the HDD storage device 42(3). Accordingly, the RAID group 100 is intact providing access 110 to the host computers 22. At no point was there any data unavailability or data loss. Moreover, the RAID group 100 is able to sustain another storage device failure without losing data. Further details will now be provided with reference to FIG. 7.

Figure 7:
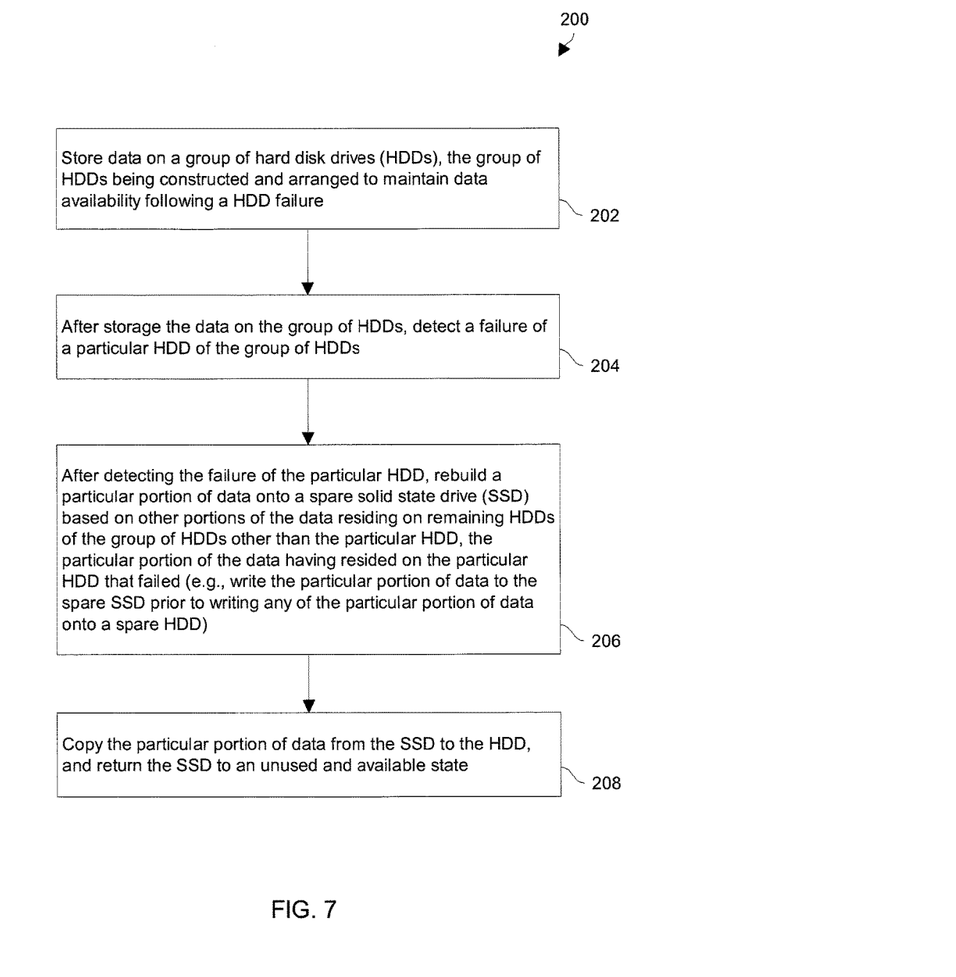
FIG. 7 is a flowchart of a procedure which is performed by the data storage equipment of FIG. 2.

FIG. 7 is a flowchart of a procedure 200 which is performed by the storage processing circuitry 40 of the data storage system 24 of FIG. 2. The procedure 200 rebuilds data from a group of HDD storage devices 42.

At 202, the storage processing circuitry 40 stores data on a group of HDDs. The group of HDDs is constructed and arranged to maintain data availability following a HDD failure (e.g., RAID 5 (4+1)). In particular, data on the failed HDD can be reconstructed from the data on the remaining HDDs.

At 204, the storage processing circuitry 40, after storing the data on the group of HDDs, detects a failure of a particular HDD of the group of HDDs.

At 206, the storage processing circuitry 40, after detecting the failure of the particular HDD, rebuilds a particular portion of data onto a spare solid state drive (SSD) based on other portions of the data residing on remaining HDDs of the group of HDDs other than the particular HDD, the particular portion of the data having resided on the particular HDD that failed. Such operation involves selecting an available hot spare SSD perhaps from multiple hot spare SSDs which are available for use and confirming that the storage capacity on the selected SSD is greater or equal to the capacity of the failed HDD. Such operation further involves reconstructing and writing the particular portion of data to the spare SSD prior to writing any of the particular portion of data onto a spare HDD (e.g., a hot spare HDD of a moderate speed data storage tier). During such operation, the storage processing circuitry 40 continues to provide data availability (e.g., by responding to I/O requests, by promoting frequently access data to a faster tier and demoting less frequently accessed data to a slower tier, etc.).

At 208, the storage processing circuitry 40 copies the particular portion of data from the SSD to the spare HDD, and returns the spare SSD to an unused and available state. Again, during such operation, the storage processing circuitry 40 continues to provide data availability (e.g., by responding to I/O requests, by promoting frequently access data to a faster tier and demoting less frequently access data to a slower tier, etc.).

As described above, improved techniques are directed to rebuilding data on flash memory (e.g., a SSD storage device 42) regardless of the type of storage device 42 that fails. Such techniques minimize the amount of time that the data on the remaining storage devices 42 is vulnerable to data loss due to a second storage device failure (e.g., less than half of the time to rebuild the data on a magnetic storage drive). Along these lines, if a magnetic disk drive of a RAID group 100 fails, data can be rebuilt on an available flash drive and copied to a spare magnetic disk drive. Even though it may take some time for the rebuilt data to be fully stored on the spare magnetic disk drive, the data is no longer vulnerable to data loss due to a second failed magnetic disk drive once the data has been rebuilt on the flash drive.

One should appreciate that the above-described techniques do not merely apply an algorithm to rebuild data. Rather, the disclosed techniques involve a technological improvement. In particular, the amount of time in which the data stored within a group of storage devices (e.g., a RAID group of magnetic disk drives) is vulnerable to data loss due to a second storage device failure is minimized. With the improved techniques, other advantages are available as well such as the ability to perform load and store operations on a hybridized storage tier (i.e., a tier of at least one HDD and at least one SSD) during the rebuild process, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

One should appreciate that although the storage capacity of HDDs continues to increase dramatically, unfortunately the failure rate of HDDs has also been increasing. Moreover, as the storage capacity has increased, the window of a potential second HDD failure in a RAID group has increased as well due to the larger rebuild time. If a second HDD fails before the rebuild of the first HDD completes, there is data loss.

However, with the advent of large capacity SSDs, it is now possible to increase the rebuild rate by rebuilding to a spare SSD. This reduces the window where a second drive failure would lead to data loss. In general, writing to a SSD is roughly 100 times (or more) faster than writing to a HDD. When the rebuild to the spare SSD is complete (and therefore the RAID group is no longer susceptible to a second drive failure), the data from the SSD can be copied to a spare HDD. Since the SSD remains part of the RAID group until the copy is complete there is no reduction in data protection during the copy. Once the data copy from the SSD to HDD is complete the SSD is removed from the RAID group and is available for a spare drive of another RAID group. For the majority of failure cases, only one spare SSD is required for the entire storage system.

One should further appreciate that a conventional rebuild using a spare HDD suffers from a much longer rebuild time. That is, performance of HDDs has not been increasing as rapidly as their capacity. Accordingly, the window where a second drive can fail in a RAID group has steadily increased as HDD drive capacities have increased. If a second drive in the RAID group fails before the rebuild of the first drive is complete, there is data loss.

With the improved techniques disclosed herein, rebuilding to an SSD can complete in less than half the time. Thus, the window for data loss is halved. Along these lines, a spare SSD is selected as 'temporary' replacement for a failed HDD. Next, data that resided on the failed HDD is rebuilt on the SSD and thus the RAID group is no longer degraded. The, the data is copied from the SSD to a spare HDD and, during this copy period, the RAID group remains the non-degraded state and thus does not lose data in the event of a second drive failure. Finally, copying completes and the spare HDD replaces SSD in the RAID group. Accordingly, the SSD is now available as spare again.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

In some arrangements, prior to using a hot spare SSD storage device 42 to rebuild data on a failed HDD storage device 42, the storage processing circuitry 40 selects a candidate SSD from the multiple available SSDs, and confirms that the candidate SSD has a storage capacity that is greater than or equal to a storage capacity of the particular HDD that failed. In alternative arrangements, the storage processing circuitry 40 configures SSDs with less storage capacity than that of the HDD that failed into a logical combination of SSDs which provides storage capacity that is greater than or equal to the storage capacity of the HDD that failed, and then rebuilds the data on the logical combination of SSDs. Such modifications and enhancements are intended to belong to various embodiments of the disclosure.

What is claimed is:

1. In data storage equipment, a method of rebuilding data from a group of hard disk drives (HDDs), the method comprising:
    storing data on a group of HDDs of a first storage tier, the group of HDDs being constructed and arranged to maintain data availability following a HDD failure;
    after storing the data on the group of HDDs, detecting a failure of a particular HDD of the group of HDDs; and
    after detecting the failure of the particular HDD, rebuilding a particular portion of data onto a solid state drive (SSD) of a second storage tier that is faster than the first storage tier based on other portions of the data residing on remaining HDDs of the group of HDDs other than the particular HDD, the particular portion of the data having resided on the particular HDD that failed;
    wherein rebuilding the particular portion of data onto the SSD based on other portions of the data residing on remaining HDDs of the group of HDDs other than the particular HDD includes:
        reading a first portion of the data from a first HDD of the group of HDDs, the first portion of the data being different from the particular portion of the data, and the first HDD being different from the particular HDD,
        reading a second portion of the data from a second HDD of the group of HDDs, the second portion of the data being different from the particular portion of the data, and the second HDD being different from the particular HDD,
        performing a reconstruction operation that reconstructs the particular portion of data from the first portion of the data and the second portion of the data, and
        writing the particular portion of the data to the SSD.

2. A method as in claim 1 wherein the data storage equipment forms at least part of a data storage system which includes a spare HDD and a spare SSD; and
  wherein writing includes writing the particular portion of data to the spare SSD prior to writing any of the particular portion of data onto the spare HDD.

3. A method as in claim 2 wherein the data storage equipment is constructed and arranged to manage host data on behalf of a set of host computers;
  wherein the method further comprises:
    promoting frequently accessed host data from the first storage tier having the group of HDDs to the second storage tier having the SSD, and
    demoting infrequently accessed host data from the second storage tier to the first storage tier, the frequently access host data being more frequently accessed than the infrequently accessed host data.

4. A method as in claim 3, further comprising:
  copying the particular portion of data from the spare SSD to the spare HDD, and
  after the particular portion of data is copied from the spare SSD to the spare HDD, returning the spare SSD to an unused and available state.

5. A method as in claim 4 wherein copying the particular portion of data from the spare SSD to the spare HDD includes:
  prior to writing any data to the spare HDD, detecting a rebuild completion event in which the particular portion of data becomes fully restored on the spare SSD, and
  in response to the rebuild completion event, writing the particular portion of data from the spare SSD to the spare HDD.

6. A method as in claim 2 wherein the data storage system includes multiple available SSDs; and
  wherein rebuilding the particular portion of data onto the SSD further includes:
    prior to writing the particular portion of data to the spare SSD, selecting a candidate SSD from the multiple available SSDs,
    confirming that the candidate SSD has a storage capacity that is greater than or equal to a storage capacity of the particular HDD that failed, and
    initiating a rebuild process to rebuild the particular portion of data upon confirming that the storage capacity of the candidate SSD is greater than or equal to the storage capacity of the particular HDD that failed.

7. A method as in claim 2 wherein the data storage system includes multiple available SSDs, each available SSD having a storage capacity which is less than a storage capacity of the particular HDD that failed; and
  wherein rebuilding the particular portion of data onto the SSD further includes:
    prior to writing the particular portion of data to the spare SSD, configuring the multiple available SSDs into a logical combination of SSDs, the logical combination of SSDs providing a storage capacity that is greater than or equal to the storage capacity of the particular HDD that failed and operating as the spare SSD, and
    initiating a rebuild process to rebuild the particular portion of data upon configuring the multiple available SSDs into the logical combination of SSDs.

8. A method as in claim 4 wherein copying the particular portion of data from the spare SSD to the spare HDD includes:
  writing at least some of the particular portion of data from the spare SSD to the HDD while the particular portion of data is being rebuilt onto the spare SSD.

9. A method as in claim 4 wherein the data storage equipment includes storage processing circuitry which is constructed and arranged to process input/output (I/O) requests from the host computers; and
  wherein the method further comprises:
    processing a set of I/O requests from the host computers while the particular portion of data is being rebuilt onto the spare SSD.

10. A method as in claim 4 wherein the data storage equipment includes storage processing circuitry which is constructed and arranged to process input/output (I/O) requests from the host computers; and
  wherein the method further comprises:
    providing data elements from the spare SSD to the set of host computers in response to a set of I/O requests from the host computers.

11. A method as in claim 10 wherein providing data elements from the spare SSD to the set of host computers includes:
  in response to an I/O request from a host computer, reading a data element from the spare SSD and sending the data element to the host computer while the particular portion of data is being rebuilt onto the spare SSD.

12. A method as in claim 10 wherein providing data elements from the spare SSD to the set of host computers includes:
  in response to an I/O request from a host computer, reading a data element from the spare SSD and sending the data element to the host computer while the particular portion of data is being copied from the spare SSD to the spare HDD.

13. A method as in claim 1 wherein performing the reconstruction operation includes:
  performing a set of XOR operations that generate the particular portion of data from the first portion of the data and the second portion of the data.

14. Data storage equipment, comprising:
  memory; and
  control circuitry coupled to the memory, the memory storing instructions which, when carried out by the control circuitry, cause the control circuitry to:
    store data on a group of hard disk drives (HDDs) of a first storage tier, the group of HDDs being constructed and arranged to maintain data availability following a HDD failure,
    after storing the data on the group of HDDs, detect a failure of a particular HDD of the group of HDDs, and
    after detecting the failure of the particular HDD, rebuild a particular portion of data onto a solid state drive (SSD) of a second storage tier that is faster than the first storage tier based on other portions of the data residing on remaining HDDs of the group of HDDs other than the particular HDD, the particular portion of the data having resided on the particular HDD that failed;
  wherein the control circuitry, when rebuilding the particular portion of data onto the SSD based on other portions of the data residing on remaining HDDs of the group of HDDs other than the particular HDD, is constructed and arranged to:
    read a first portion of the data from a first HDD of the group of HDDs, the first portion of the data being different from the particular portion of the data, and the first HDD being different from the particular HDD, read a second portion of the data from a second HDD of the group of HDDs, the second portion of the data being different from the particular portion of the data, and the second HDD being different from the particular HDD, perform a reconstruction operation that reconstructs the particular portion of data from the first portion of the data and the second portion of the data, and write the particular portion of the data to the SSD.

15. Data storage equipment as in claim 14 wherein the data storage equipment is constructed and arranged to form at least part of a data storage system which includes a spare HDD and a spare SSD; and wherein the control circuitry, when writing the particular portion of data, is constructed and arranged to write the particular portion of data to the spare SSD prior to writing any of the particular portion of data onto the spare HDD.

16. Data storage equipment as in claim 15 wherein the data storage system includes multiple available SSDs; and wherein the control circuitry, when rebuilding the particular portion of data onto the SSD, is further constructed and arranged to:

prior to writing the particular portion of data, select a candidate SSD from the multiple available SSDs, confirm that the candidate SSD has a storage capacity that is greater than or equal to a storage capacity of the HDD that failed, and initiate a rebuild process to rebuild the particular portion of data upon confirming that the storage capacity of the candidate SSD is greater than or equal to the storage capacity of the HDD that failed.

17. Data storage equipment as in claim 16 wherein the data storage equipment further comprises a host interface which is constructed and arranged to communicate with a set of host computers, the host interface being coupled to the control circuitry; and wherein the control circuitry is further constructed and arranged to:

manage host data on behalf of the set of host computers, while managing host data on behalf of the set of host computers, promote frequently accessed host data from the first storage tier having the group of HDDs to the second storage tier having the SSD, and while managing host data on behalf of the set of host computers, demote infrequently accessed host data from the second storage tier to the first storage tier, the frequently access host data being more frequently accessed than the infrequently accessed host data.

18. Data storage equipment as in claim 17 wherein the control circuitry is further constructed and arranged to:

copy the particular portion of data from the spare SSD to the spare HDD, and after the particular portion of data is copied from the spare SSD to the spare HDD, return the spare SSD to an unused and available state.

19. Data storage equipment as in claim 18 wherein the control circuitry, when managing host data on behalf of the set of host computers, is constructed and arranged to:

in response to a first I/O request from the set of host computers, read a first data element from the spare SSD and send the first data element to the set of host computers while the particular portion of data is being rebuilt onto the spare SSD, and in response to a second I/O request from the set of host computers, read a second data element from the spare SSD and send the second data element to the set of host computers while the particular portion of data is being copied from the spare SSD to the spare HDD.

20. Data storage equipment as in claim 14 wherein the control circuitry, when performing the reconstruction operation, is constructed and arranged to:

perform a set of XOR operations that generate the particular portion of data from the first portion of the data and the second portion of the data.

21. A computer program product having a non-transitory computer readable medium which stores a set of instructions to rebuild data from a group of hard disk drives (HDDs); the set of instructions, when carried out by computerized circuitry, causing the computerized circuitry to perform a method of:

storing data on a group of HDDs of a first storage tier, the group of HDDs being constructed and arranged to maintain data availability following a HDD failure;

after storing the data on the group of HDDs, detecting a failure of a particular HDD of the group of HDDs; and after detecting the failure of the particular HDD, rebuilding a particular portion of data onto a solid state drive (SSD) of a second storage tier that is faster than the first storage tier based on other portions of the data residing on remaining HDDs of the group of HDDs, the particular portion of the data having resided on the particular HDD that failed;

wherein rebuilding the particular portion of data onto the SSD based on other portions of the data residing on remaining HDDs of the group of HDDs other than the particular HDD includes:

reading a first portion of the data from a first HDD of the group of HDDs, the first portion of the data being different from the particular portion of the data, and the first HDD being different from the particular HDD, reading a second portion of the data from a second HDD of the group of HDDs, the second portion of the data being different from the particular portion of the data, and the second HDD being different from the particular HDD, performing a reconstruction operation that reconstructs the particular portion of data from the first portion of the data and the second portion of the data, and writing the particular portion of the data to the SSD.

* * * * *